UNITED STATES PATENT OFFICE.

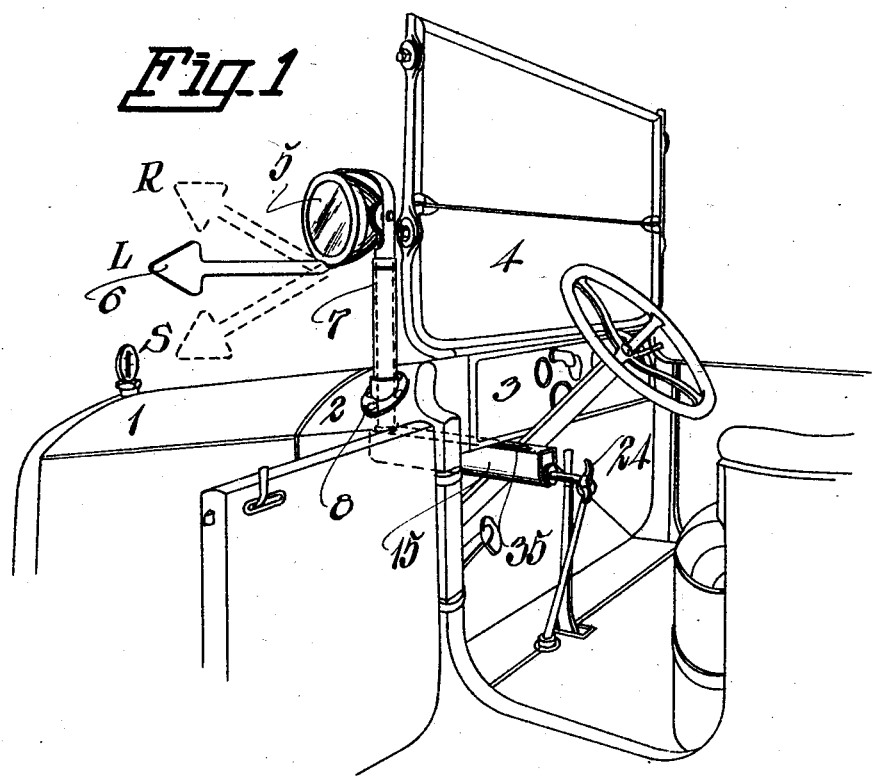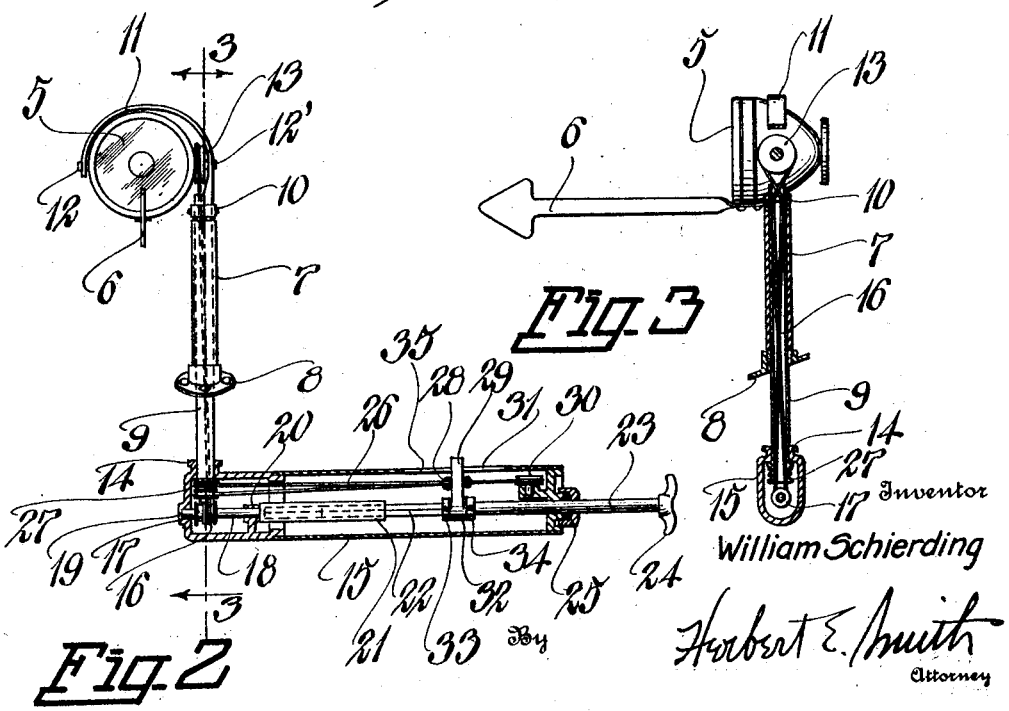

WILLIAM SCHIERDING, OF SPOKANE, WASHINGTON.

AUTOMOBILE SIGNAL.

1,406,290.  Specification of Letters Patent.  Patented Feb. 14, 1922.

Application filed July 17, 1920. Serial No. 397,003.

*To all whom it may concern:*

Be it known that I, WILLIAM SCHIERDING, a citizen of Germany, residing at Spokane, in Spokane County, and State of Washington, have invented certain new and useful Improvements in Automobile Signals, of which the following is a specification.

The present invention relates to an improved automobile signal which combines with a traffic signalling device a spotlight for illuminating the roadway, and also for illuminating the traffic signal or direction indicting device, at night, in order that the indicator may be visible from the rear of the automobile to show the direction of intended turns, or to show the invention to stop the car which is carrying the signals.

The invention consists in certain novel combinations and arrangements of parts, controlled by the driver of the car or automobile, from his seat, whereby the electric lamp forming the spotlight may be moved horizontally from its normally forward pointing position with relation to the car, not only to a position extending at right angles to the longitudinal axis of the car, but also vertically. Thus through the instrumentality of one manipulating lever device, the lamp and its rigid direction indicator may be swung on a horizontal pivot and simultaneously on a vertical pivot, if required, to indicate the direction of a proposed turn of the car, or the lamp and its direction-indicating arrow may be swung on the vertical pivot of the lamp only to hold the arrow in laterally extended horizontal position to indicate a proposed stop of the automobile.

In carrying out the invention I have illustrated in the accompanying drawings one complete example of the physical embodiment of my invention in which the parts are combined and arranged according to the best mode I have thus far devised for the practical application of the principles of my invention. In different types of automobiles, colorable changes or alterations may be required to adapt my invention to different conditions, but such changes and alterations may be made without departing from the spirit of my invention. Other changes may also be made, as for instance, a mirror may be utilized at the rear of the electric lamp or spotlight for the convenience of the driver of the automobile, and such contemplated changes yet remain within the scope of my appended claims.

Figure 1 is a perspective view showing so much of an automobile as is necessary to illustrate my invention.

Figure 2 is a detail elevation view, partly in section showing the lamp and indicator, and operating parts.

Figure 3 is a detail sectional view at line 3—3 of Figure 2.

In order that a clear understanding of the invention may be obtained I have illustrated in Figure 1 a conventional type of automobile showing the hood 1, cowl 2, dash board 3, windshield 4, and other features not necessary to mention herein.

The spotlight or single headlight 5 may be of any approved or usual form, and for the purpose of my invention, has rigidly attached thereto an indicator or arm in the shape of an arrow 6, secured at the under side of the lamp casing, and projecting forward of the lamp, on its longitudinal axis. Thus it will be understood that the lamp and arrow form a rigid structure and may be moved or swung horizontally and vertically for carrying out and attaining the objects of my invention.

The lamp and indicator, in the present instance, are located at the left of the wind shield and supported by a hollow, metal standard or post 7, secured to the cowl 2 by the ring plate 8. The standard forms an enclosing casing and guide for the vertical horizontally rotatable shaft 9 which has fixed near its upper end, above the top edge of the standard, a collar or head 10 resting on the upper edge of the standard, and above the upper end of the shaft is a laterally curved yoke 11, semi-circular in form and providing a rigid extension of the shaft.

Within the yoke are alined radial trunnions 12 and 12′ upon which the lamp 5 is swiveled and adapted to be turned in a vertical plane, and a sheave 13 or grooved pulley is fixed to turn with the trunnion 12′, for a purpose to be described.

At its lower end the shaft 9 projects through the cowl 2 of the automobile, and is supported to revolve in bearings 14 formed in the upper wall near the end of a metallic casing or shell 15, which extends rearwardly, in a horizontal plane from the dash board 3 and projects a suitable distance toward the front seat of the automobile to accomplish its purpose.

A cable or cord 16, at its upper end is attached to and passed over the sheave 13 on the trunnion 12' and this cable extends down through the hollow shaft 9 into the interior of the casing 15 and has one or more turns around a pulley 17 near the front end of a shaft section 18. The shaft section 18 is a round bar, or rod having a bearing 19 in the end of the casing 15 and an interior bearing 20, supports it within the casing, an alined, tubular, fixed extension 21 being provided on the end of this section as best seen in Figure 2. The interior bore of the tubular shaft extension 21 is angular, or squared, to receive the telescopic, squared rod 22, and this rod or section continues through the rear end of the casing in the form of a round rod 23, with a hand grasp or handle 24 at its extremity. In the rear end of the casing or shell 15 is provided a packing joint 25 for the rod section 23 to afford sufficient friction between the rod 23 and the joint to stabilize the movement of the rod 23, for it will now be apparent that the rod 22—23 is capable of longitudinal sliding movement through the end of the casing and in the tubular extension 21 of the rod 18. Thus, by grasping the handle 24, the driver may push in on the handle to swing the lamp and arrow laterally, or turn or twist the handle 23 and swing the lamp and arrow vertically, or both movements may be accomplished simultaneously. By turning the handle 23, the squared end 22 of the shaft rotates the tubular extension 21 and its rod 18 to revolve the pulley 17 and wind the cable 16 thereon. The pull on the cable over the sheave 13 causes the lamp and its arrow to swing in a vertical plane on the trunnions 12 and 12'.

In Figure 1 the lamp and arrow are turned laterally, and the arrow is in position to indicate a turn to the left; for a turn to the right the lamp is turned, and the arrow with it, to the upper dotted line position, and as an indication that the automobile is about to stop, the lamp and arrow are turned to the position indicated by the lower dotted arrow.

For swinging the lamp and arrow laterally, the shaft 9 is revolved in its bearings 14 and 10, through the instrumentality of a second cable 26 that is passed around a pulley 27 on the lower end of the shaft 9 below its bearing 14. Two or three turns of the pulley are taken around the pulley and thence the two flights of the cable are passed toward the rear of the inclosing casing 15, one end being attached to the near side at 28 to a lug 29 on the rod 23, and the other end of the cable is passed around the rear pulley 30 and attached at the opposite side of the lug 29 at 31. The lug is loose on the rod 23 to permit rotation of the rod within the hub 32 of the lug, but the lug is stationary on the rod and retained between the two fixed collars 33 and 34 on the rod 23. A guide slot 35 is provided in the upper plate of the casing to permit longitudinal movement therein of the lug but also to restrict and prevent lateral movement of the lug with relation to the casing or rod 23. From this description it will be obvious that the rod 23 may be slid inwardly or outwardly of the casing in its bearings 25 and 21 and that the lug will be moved with the rod 23, guided in its slot 35. The movement of the lug with the attached ends of the cable 26 will cause the cable to revolve the pulleys 27 and 30, and the motion of the pulley 27 fixed on the shaft 9 also causes said shaft to revolve, supported by its collar 10 and in bearing 14, resulting in a horizontal swinging motion of the lamp and indicating arrow.

Thus the extensible, telescoping shaft made up of the sections 18, 21, 22, 23 may be turned bodily in its bearings 19, 20, 25, for tilting the lamp and arrow, and the longitudinally movable portion of the shaft made up of the two sections 22, 23, may be pushed inwardly or pulled outwardly from a central or intermediate position, as in Figure 1, which position is normal with respect to the lug 27, but the arrow indicates a left turn. A turn on the handle in Figure 1 will move the arrow to the position R for a right turn; a reverse movement of the handle 24 restores the arrow to horizontal position, and a continued turn on the handle will swing the lamp and arrow down to S position for indication of a proposed stop.

When not in use to indicate turns or stopping of the automobile, the lamp and arrow are turned to the front, as indicated in Figure 3, and the lamp may be manipulated on its two pivot supports for illumination of the roadway to the right or left, or for lighting the roadway at a distance and also for lighting the roadway in the immediate front of the automobile, and these manipulations may be accomplished with facility and convenience by the driver who has the handle 24 in readily accessible position.

Having thus fully described my invention, what I claim is—

1. The combination with the vertically disposed revolvable shaft, a pivoted lamp and indicator carried thereby, of a telescopic shaft and connections therefrom for revolving the vertical shaft, and means actuated by the telescopic shaft for swinging the pivoted lamp and indicator, for the purpose described.

2. The combination with a hollow standard, a hollow shaft revolvable therein, a lamp pivoted on the shaft, and an indicator carried by the lamp, of a second, extensible shaft and a pulley thereon, a cord on the pulley passed through the hollow shaft, a second pulley co-acting with the pivoted lamp and supporting said cord, and means actuated by a portion of the extensible shaft for revolving said hollow shaft, for the purpose described.

3. The combination with the hollow standard, a hollow shaft having a bearing collar supported on said standard and extended through the standard, a yoke on the shaft, a lamp pivoted in said yoke, and an indicator carried by said lamp, a pulley rigid with the lamp, an extensible shaft and a pulley thereon, a cable operatively connecting said pulleys, and means actuated by the extensible shaft for revolving the hollow shaft.

4. The combination with a hollow standard, a hollow shaft therein having a bearing collar supported on said standard, a yoke extended above said shaft, a lamp and indicator having trunnions in said yoke, a pulley on one of said trunnions, and a cable operatively connected on said pulley, of a second shaft having a pulley thereon for the cable, and connections from said second shaft to revolve the hollow shaft.

5. The combination with a vertical revolvable shaft and a combined lamp and indicator pivoted thereon, of an extensible shaft and connections therefrom for revolving said shaft comprising a pair of spaced pulleys one of which is secured on the revolvable shaft and a connecting cable, a lug on the extensible shaft to which the opposed ends of said cable are connected, and means actuated by said extensible shaft for swinging the pivoted lamp and indicator.

6. The combination with a vertical revolvable shaft and a combined lamp and indicator pivoted thereon, of an extensible shaft and connections therefrom for swinging said pivoted lamp, an inclosing slotted casing for the extensible shaft, a pulley on the revolvable shaft and a complementary pulley in said casing, and a cable operatively connected with said pulleys, a lug on the extensible shaft guided in the slotted casing and the two ends of said cable attached at opposite sides of said lug, substantially as described.

In testimony whereof I affix my signature.

WILLIAM SCHIERDING.